US010547938B2

(12) United States Patent
Carreras et al.

(10) Patent No.: US 10,547,938 B2
(45) Date of Patent: Jan. 28, 2020

(54) AUDIO SIGNAL TRANSMISSION

(71) Applicant: Bose Corporation, Framingham, MA (US)

(72) Inventors: Ricardo F. Carreras, Southborough, MA (US); Christopher A. Barnes, Saugus, MA (US); Kemal Kulovic, Arlington, MA (US); John Lloyd Goodman, Bellingham, MA (US)

(73) Assignee: Bose Corporation, Framingham, MA (US)

( * ) Notice: Subject to any disclaimer, the term of this patent is extended or adjusted under 35 U.S.C. 154(b) by 78 days.

(21) Appl. No.: 15/683,214

(22) Filed: Aug. 22, 2017

(65) Prior Publication Data

US 2019/0069082 A1 Feb. 28, 2019

(51) Int. Cl.

*G06F 17/00* (2019.01)
*H04R 3/00* (2006.01)
*H01R 24/64* (2011.01)
*H01R 13/66* (2006.01)
*H01R 107/00* (2006.01)

(52) U.S. Cl.

CPC ............. *H04R 3/00* (2013.01); *H01R 13/665* (2013.01); *H01R 24/64* (2013.01); *H01R 2107/00* (2013.01); *H04R 2420/05* (2013.01); *H04R 2420/09* (2013.01)

(58) Field of Classification Search

CPC ............ H04R 2420/03; H04R 2420/05; H04R 2420/09

See application file for complete search history.

(56) References Cited

U.S. PATENT DOCUMENTS

2007/0230715 A1* 10/2007 Ingemi .................. H03G 11/02 381/74
2009/0304069 A1* 12/2009 Hoffert .................. H04N 5/775 375/240.01
2013/0145057 A1* 6/2013 Rathi .................. G06F 13/4286 710/38
2014/0198928 A1* 7/2014 Li ............................ H04R 3/00 381/74
2015/0098598 A1* 4/2015 Kulavik .................. H04S 1/005 381/309
2017/0192923 A1* 7/2017 Liu ....................... G06F 13/385

* cited by examiner

*Primary Examiner* — Joseph Saunders, Jr.
(74) *Attorney, Agent, or Firm* — Brian M. Dingman; Dingman IP Law, PC

(57) ABSTRACT

A method of transferring audio signals from an analog audio source to an audio sink, where the audio sink has a multiple-pin connector. A cable is coupled to the audio source and to the multiple-pin connector of the audio sink, where the cable is constructed and arranged to carry audio signals. The audio sink detects a return signal provided to the audio sink over the cable, where the audio sink is configured to interpret the receipt of a return signal as indicating that an audio source is operably connected to the audio sink by the cable. Responsive to this detecting, the audio sink receives audio signals from the audio source over the cable.

19 Claims, 3 Drawing Sheets

AUDIO SIGNAL TRANSMISSION

BACKGROUND

This disclosure relates to transmission of audio signals from an audio source to an audio sink.

Not all headphones and other audio sink devices carry an analog audio input jack. Such devices are often configured to receive audio signals wirelessly. However, not all audio sources are able to wirelessly transmit audio signals.

SUMMARY

All examples and features mentioned below can be combined in any technically possible way.

In one aspect, a method of transferring audio signals from an analog audio source to an audio sink, where the audio sink has a multiple-pin connector, includes coupling a cable to the audio source and to the multiple-pin connector of the audio sink, where the cable is constructed and arranged to carry audio signals, detecting, by the audio sink, a return signal provided to the audio sink over the cable, where the audio sink is configured to interpret the receipt of a return signal as indicating that an audio source is operably connected to the audio sink by the cable, and responsive to the detecting, receiving, by the audio sink from the audio source over the cable, audio signals.

Embodiments may include one of the following features, or any combination thereof. The cable may comprise a plug that is constructed and arranged to couple to an audio output jack of the audio source, and a USB-C connector that is constructed and arranged to couple to a USB-C connector of the audio sink. The method may further comprise transmitting, by the audio sink over a first signaling line of the cable, a cable communication signal indicating that the sink should use audio signals received over the cable as a source of audio for the audio sink. The return signal may be based on the cable communication signal. The return signal may be transmitted over a second signaling line that is electrically coupled to the first signaling line.

Embodiments may include one of the following features, or any combination thereof. The method may further comprise detecting, by the audio sink, a bus power input, and in response enabling the audio sink to accept audio signals from a source other than the analog audio source. The cable may comprise a processor that is adapted to convert analog audio signals to digital audio signals, and provide the digital audio signals to the audio sink. The method may further comprise providing operating power from the audio sink to the processor of the cable. The method may further comprise attenuating audio signals in the cable.

In another aspect, a system for receiving, by an audio sink, audio signals from an analog audio source, includes a cable that is constructed and arranged to carry audio signals, and that comprises a first connector that is constructed and arranged to be coupled to an audio output of the audio source, a second connector that is constructed and arranged to be coupled to an audio input of the audio sink, and circuitry of the audio sink that is adapted to detect a return signal provided to the audio sink over the cable. The audio sink is configured to interpret the receipt of a return signal as indicating that an audio source is operably connected to the audio sink by the cable, and in response cause the reception of audio signals by the audio sink from the audio source over the cable.

Embodiments may include one of the following features, or any combination thereof. The cable may comprise a plug that is constructed and arranged to couple to an audio output jack of the audio source, and a USB-C connector that is constructed and arranged to couple to a USB-C connector of the audio sink. The second connector of the cable may comprise a multiple contact connector that is constructed and arranged to couple to a multiple contact/pin audio input connector of the audio sink. The circuitry of the audio sink may be further adapted to transmit over a first signaling line of the cable a cable communication signal indicating that the sink should use audio signals received over the cable as a source of audio for the audio sink. The return signal may be based on the cable communication signal. The return signal may be transmitted over a second signaling line that is electrically coupled to the first signaling line.

Embodiments may include one of the following features, or any combination thereof. The circuitry of the audio sink may be further adapted to detect a bus power input and in response enable the audio sink to accept audio signals from a source other than the analog audio source. The cable may comprise a processor that is adapted to convert analog audio signals to digital audio signals and provide the digital audio signals to the audio sink. The audio sink may be further adapted to provide operating power to the processor of the cable. The cable may further comprise an attenuator that is adapted to attenuate audio signals.

In another aspect, a cable includes a first connector that is constructed and arranged to be coupled to an audio output of an analog audio source, a USB-C connector that is constructed and arranged to be coupled to a USB-C input connector of an audio sink, and a first set of conductors that are constructed and arranged to carry audio signals. A second set of conductors are constructed and arranged to receive from the audio sink a cable communication signal that indicates that the sink should use audio signals received over the first set of conductors as a source of audio for the audio sink, and provide back to the audio sink a return signal that is based on the cable communication signal. The second set of conductors may comprise two separate USB-C signaling lines that are electrically coupled together.

DETAILED DESCRIPTION

Figure 1:
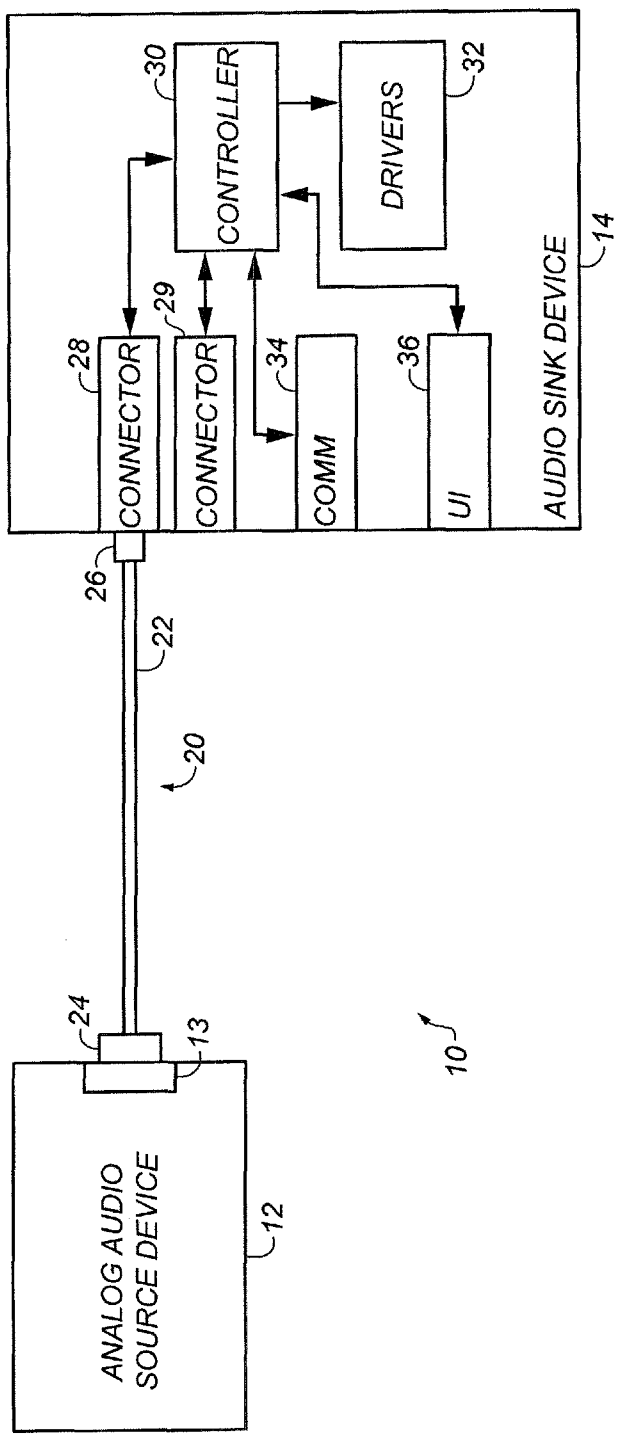
FIG. 1 is schematic diagram of a system for conducting analog audio signals from a source to a sink via a cable.

Some wireless headphones, and other wireless audio sink devices such as portable speakers, no longer include an analog audio input jack (e.g., a standard 3.5 mm jack) and are designed to receive audio data wirelessly. However, some audio sources do not have wireless audio data transmission capabilities and so cannot be wirelessly coupled to these audio sinks. Some audio sources only have a hard-wired audio output (e.g., an audio output jack), including, without limitation, the entertainment systems of many commercial airliners, and older audio systems. Some wireless audio sink devices include a multiple-pin connector, such as USB-C connector. In order for these wireless audio sinks to receive audio signals from sources that are not enabled for wireless transmission, a cable or dongle can be provided, where the cable has connectors that can be coupled to the output connector of the source and a multiple-pin connector of the sink. The audio sink can be enabled to automatically detect when the cable has been connected to it, so that it receives its audio signals over the cable rather than from another source. For illustrative purposes, the audio sink devices described herein may be one or more audio devices, such as a portable speaker, a speaker that is part of a home theater system, and headphones. Unless specified otherwise, the term headphone, as used in this document, includes various types of personal acoustic devices such as over-the-ear and in-ear headsets, earphones, earbuds, hearing aids, shoulder or body-worn acoustic devices, or other wireless-enabled acoustic devices.

Elements of the figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together, or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

FIG. 1 is a schematic diagram of one non-limiting example of system 10 that is adapted to allow audio sink device 14 to receive audio signals from analog audio source device 12. Typically, but not necessarily, source 12 does not have wireless data transmission capabilities, but does have a hard-wired audio data output; a hard-wired data output is represented by connector 13, which may be a standard 3.5 mm audio jack as only one non-limiting example. Audio sink device 14, which in non-limiting examples may be wireless headphones or a wireless loudspeaker, has hard-wired connector 28. Connector 28 may be a multiple-pin connector of a type known in the art. One non-limiting example is a USB connector, such as a USB-C connector, which is a 24-pin, fully reversible connector system that allows transport of data and energy. The connector pinouts and cable wiring of USB-C connectors are established by and published by the USB Implementers Forum, and are well known in the field.

Electrical cable assembly 20 is coupled to both connector 13 and connector 28. Cable connectors 24 and 26 are designed to couple to the respective device connectors 13 and 28. Cable assembly 20 includes multiple-conductor electrical cable 22. Cable 22 has, at minimum, sufficient separate conductors to accomplish the functionalities described herein, and may have additional conductors as well, so as to allow for different or additional functionalities. A specific example is described below. In one non-limiting example, connector 24 is a standard analog audio connector, such as a 3.5 mm audio plug. In one non-limiting example, connector 26 is a USB-C connector.

Audio sink device 14 comprises controller 30 that is operably coupled to connector 28, so that it can receive (or, at least have necessary effects on) electrical signals received over cable assembly 20. In some instances, and as further described elsewhere, controller 30 is also enabled to cause the transmission of one or more signals out, over cable assembly 20. Device 14 also includes audio driver(s) 32, communications interface 34, and user interface (UI) 36. Other features of audio sink devices that are not involved in the present disclosure are not shown or described for the sake of convenience.

Audio sink device 14 is adapted to detect when cable assembly 20 has been operably coupled to device 14. In one non-limiting example, this detection is accomplished using controller 30. Controller 30 is adapted to transmit a signal out over connector 28 and into cable 20. This signal, which may be termed herein a cable communication signal, will be used to indicate that device 14 should use audio signals received from source 12 over cable assembly 20 as a source of audio for device 14. As is further described below, cable assembly 20 can be enabled to receive this cable communication signal, and, in response, return to device 14 a return signal that is based on the cable communication signal. In this example, when controller 30 causes a cable communication signal to be transmitted, and detects a return signal received via connector 28, device 14 is enabled to conclude that an audio source is coupled to device 14 via cable assembly 20. Device 14 will then, via controller 30, be enabled to receive audio signals from source device 12 over cable assembly 20. Received audio signals can be played by drivers 32.

Audio sink device 14 can also be enabled to detect when a source is not connected to it by cable assembly 20, in which case it can be enabled to accept audio data from another source (e.g., wirelessly via communication functionality 34). In instances in which device 14 is a wireless sink, such other source will typically but not necessarily use a wireless transmission standard of a type well-known in the art to wirelessly transmit audio data to device 14 (e.g., Bluetooth, Bluetooth Low Energy (BLE), IEEE 802.11, or other local area network (LAN) or personal area network (PAN) protocols). Detection of when a source is not connected to device 14 by cable assembly 20, in which case device 14 can be enabled to accept audio data from another source, may be accomplished in one non-limiting example by device 14 detecting a bus power input. A bus power input would typically be received over a physical connector of device 14, such as connector 28, or second connector 29 (which can be used, for example, if cable 20 is already connected to connector 28), and could be detected by controller 30, for example. Bus power input can be used in a USB-C arrangement to charge a connected device. Bus power can be supplied by a connected device such as a PC, tablet, smartphone, or a charging supply, for example. The detection of bus power input can be an indicator that cable assembly 20 may not be connected to audio sink device 14. When bus power is detected, audio sink device 14 may attempt to negotiate for audio over USB, which is a publicly supported and enabled standard.

Figure 2:
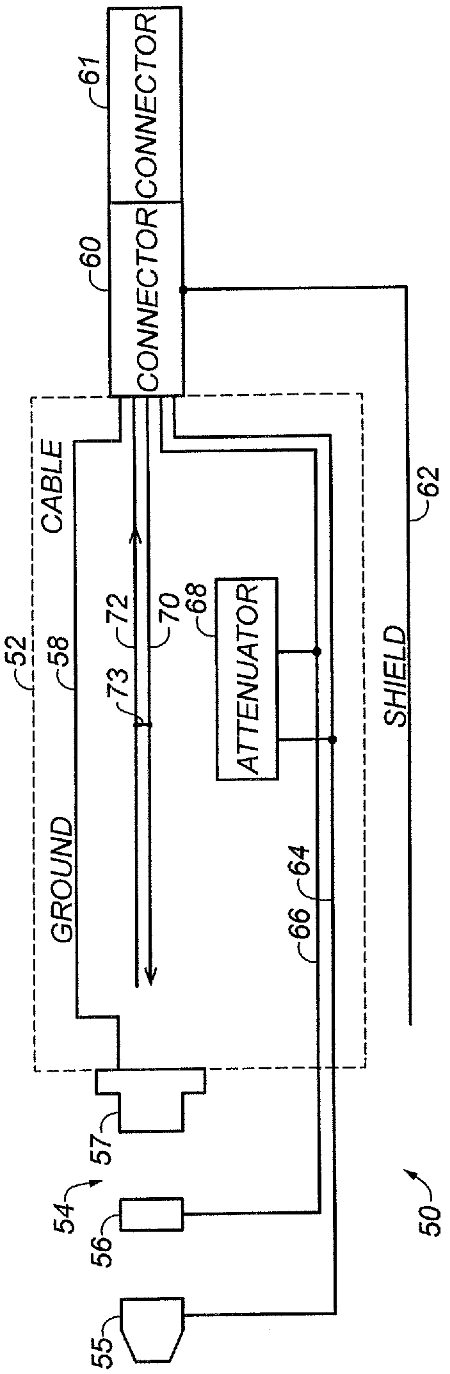
FIG. 2 is a schematic depiction of a cable.

FIG. 2 schematically depicts a non-limiting example of a cable assembly 50 of the present disclosure, which may correspond to cable assembly 20 of FIG. 1. Cable assembly 50 comprises multi-conductor cable 52 with physical connectors 54 and 60 electrically coupled to conductors. In one non-limiting example, connector 54 is a standard 3.5 mm audio connector with conductor 55, conductor 56, and conductor 57. The configuration of audio connectors is well known. Left and right analog audio signals are inputted to two of these three conductors, while the third is used for ground. In this non-limiting example, the left audio is provided to conductor 55 and its connected wire (or wire set) 64, and the right audio is provided to conductor 56 and its connected wire (or wire set) 66, while conductor 57 is the ground terminal and is connected to grounding conductor 58. Wires/wire sets 64 and 66 are connected to pins of connector 60. In one non-limiting example, connector 60 is a multi-contact/pin connector, such as a USB-C connector. The audio sink (not shown fully in FIG. 2) includes multi-contact/pin connector 61 to which cable connector 60 is electrically coupled in a known manner. Cable assembly 50 is operable to transmit audio signals from an analog audio source to an audio sink, as described above relative to FIG. 1.

In one non-limiting example, cable 52 may comprise a USB-C cable, with the conductors and functionality described in the USB-C standard, including but not limited to the USB2 communications standard. Standard pins on a USB-C connector include supply, ground and standard data lines that enable high data transfer rates. These are pins that are typically used for data transmission. In addition, the USB-C connector includes pins that are not normally utilized with a wireless headphone or wireless speaker, including the Rx1+, Rx1−, Tx1+, Tx1−, CC1 and SBU1 pins. The Rx and Tx pins are typically connected to differential wire pairs that are used for higher speed data transmission, and can be used to carry the left and right audio signals to the sink (i.e., they may comprise conductors 64 and 66). The CC1 and SBU1 pins are connected to signaling lines. Some of these unused pins can be re-purposed herein, for example they can be used to signal to the sink that it should receive analog audio signals coming in over cable assembly 50.

One example of the use of cable assembly 50 is to operably connect an in-flight entertainment system (which usually has only a 3.5 mm output jack), to wireless headphones. A cable assembly with the connectors and signal-carrying functionalities described herein can be used to operably connect the headphones via a USB-C connector on the headphones. For example, the Rx1+ and Rx1− lines could be used for left and right audio. One or more signaling lines (e.g., CC1 or SBU1) could pass a signal indicating that the sink should use audio received over the cable assembly as the source for the sink. The signal would be sent to the controller or another processor of the sink, for interpretation and processing.

As described above, the audio sink can transmit a cable communication signal that can result in the return to the sink of a return signal, which is interpreted by the sink as there being an audio source connected to the sink over the cable. An example of this cable-detection is illustrated by signal line 70, which carries a cable communication signal from the sink via connectors 61 and 60, and return signal line 72, which returns the signal to the sink via connectors 60 and 61. One non-limiting manner in which this signal transmission and return can be accomplished is by electrical connection of two separate signaling lines 70 and 72 of cable 52, electrically coupled as indicated by connection 73. In the non-limiting example of the use of a cable that has at least some of the functionality of a USB-C cable, the signaling lines can be configuration channel conductors and/or side-band use conductors. In other types of cables, two existing conductors, connected together so as to provide the return signal from the communication signal, can be used to achieve these signaling lines. Automatic switching between audio sources as accomplished with this return-signal functionality could be accomplished in other manners. Additionally, the source switching could be accomplished manually, with user input, for example via audio sink UI 36, FIG. 1, or via a user selection on an audio sink control app on a smartphone, tablet, or the like.

An optional aspect depicted in FIG. 2 is audio signal attenuation. Audio signals with a voltage that is higher than can be used by the sink can be attenuated using attenuator device 68, which is functionally coupled to lines 64 and 66. Actuation of the attenuator could be accomplished under control of a controller (not shown), or in another manner that would be apparent to one skilled in the art.

Figure 3:
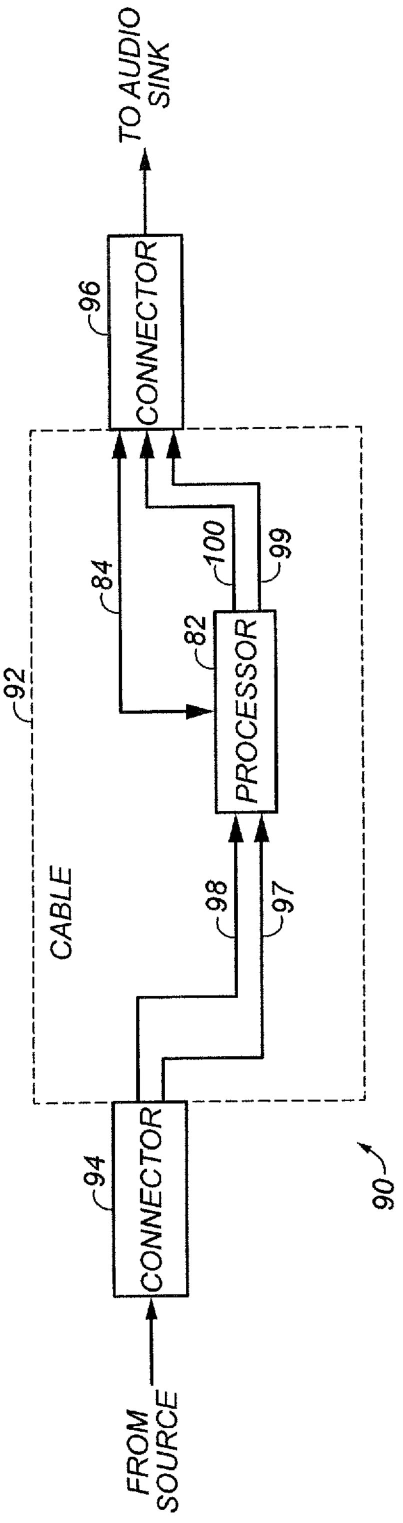
FIG. 3 is a schematic depiction of another cable.

What has been described above is a passive cable assembly that does not require any power. An active cable assembly could have its own internal power source, or could draw power from a connected device. An internal power source (e.g., a battery, not shown) could be used. FIG. 3 depicts active cable assembly 90 that draws power from the audio sink via cable connector 96 and line 84. Cable processor 82 derives its needed power from line 84. Processor 82 may, as part of its functionality, provide a return signal to the sink (via connector 96) that would be interpreted by the sink as indicating that a source is connected to the sink via cable assembly 90. This return signal could replace the return signal supplied over line 72, as described above. Thus, an active cable assembly with the ability to generate a return signal may obviate the need to use signaling or sideband conductors for the purpose of detecting when a cable is coupled to the audio sink input connector, as described above. Left and right audio signals are provided from an audio source to connector 94 and then to processor 82 over lines 97 and 98. The audio signals are then provided to the audio sink via lines 99 and 100 and cable connector 96. Processor 82 may also be enabled to digitize the analog audio signals transmitted to the sink over lines 99 and 100.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. A method of transferring audio signals from an analog audio source to an audio sink, where the audio sink has a multiple-pin connector, the method comprising:

coupling a cable to the audio source and to the multiple-pin connector of the audio sink, where the cable is constructed and arranged to carry audio signals;

transmitting a cable signal from the audio sink over the cable;

responsive to the transmitting, providing a return signal to the audio sink over the cable;

detecting, by the audio sink, the return signal provided to the audio sink over the cable, where the audio sink is configured to interpret the receipt of a return signal as indicating that an audio source is operably connected to the audio sink by the cable; and responsive to the detecting, receiving, by the audio sink from the audio source over the cable, audio signals.

2. The method of claim 1, wherein the cable comprises a plug that is constructed and arranged to couple to an audio output jack of the audio source, and a USB-C connector that is constructed and arranged to couple to a USB-C connector of the audio sink.

3. The method of claim 1, further comprising transmitting, by the audio sink over a first signaling line of the cable, a cable communication signal indicating that the sink should use audio signals received over the cable as a source of audio for the audio sink.

4. The method of claim 3, wherein the return signal is based on the cable communication signal.

5. The method of claim 4, wherein the return signal is transmitted over a second signaling line that is electrically coupled to the first signaling line.

6. The method of claim 1, further comprising detecting, by the audio sink, a bus power input, and in response enabling the audio sink to accept audio signals from a source other than the analog audio source.

7. The method of claim 1, wherein the cable comprises a processor that is adapted to convert analog audio signals to digital audio signals, and provide the digital audio signals to the audio sink.

8. The method of claim 7, further comprising providing operating power from the audio sink to the processor of the cable.

9. The method of claim 1, further comprising attenuating audio signals in the cable.

10. A system for receiving, by an audio sink, audio signals from an analog audio source, the system comprising:

a cable that is constructed and arranged to carry audio signals, and that comprises a first connector that is constructed and arranged to be coupled to an audio output of the audio source, and a second connector that is constructed and arranged to be coupled to an audio input of the audio sink;

circuitry of the audio sink that is adapted to transmit a cable signal from the audio sink over the cable, the cable being arranged to provide a return signal in response to the cable signal;

circuitry of the audio sink that is adapted to detect the return signal provided to the audio sink over the cable, where the audio sink is configured to interpret the receipt of a return signal as indicating that an audio source is operably connected to the audio sink by the cable, and in response cause the reception of audio signals by the audio sink from the audio source over the cable.

11. The system of claim 10, wherein the cable comprises a plug that is constructed and arranged to couple to an audio output jack of the audio source, and a USB-C connector that is constructed and arranged to couple to a USB-C connector of the audio sink.

12. The system of claim 10, wherein the circuitry of the audio sink is further adapted to transmit over a first signaling line of the cable, a cable communication signal indicating that the sink should use audio signals received over the cable as a source of audio for the audio sink.

13. The system of claim 12, wherein the return signal is based on the cable communication signal.

14. The system of claim 13, wherein the return signal is transmitted over a second signaling line that is electrically coupled to the first signaling line.

15. The system of claim 10, wherein the circuitry of the audio sink is further adapted to detect a bus power input, and in response enable the audio sink to accept audio signals from a source other than the analog audio source.

16. The system of claim 10, wherein the cable comprises a processor that is adapted to convert analog audio signals to digital audio signals, and provide the digital audio signals to the audio sink.

17. The system of claim 16, wherein the audio sink is further adapted to provide operating power to the processor of the cable.

18. The system of claim 10, wherein the cable further comprises an attenuator that is adapted to attenuate audio signals.

19. The system of claim 10, wherein the second connector of the cable comprises a multiple contact connector that is constructed and arranged to couple to a multiple pin audio input connector of the audio sink.

* * * * *